United States Patent [19]
Balch

[11] 3,908,753
[45] Sept. 30, 1975

[54] FREEZING-WARMING APPARATUS

[76] Inventor: Joseph C. Balch, Mile 34, Salcha, Fairbanks, Alaska 99701

[22] Filed: Apr. 19, 1974

[21] Appl. No.: 462,422

[52] U.S. Cl. .................. 165/39; 165/45; 165/85; 165/106; 165/107; 417/334
[51] Int. Cl.² ........................................ F28D 15/00
[58] Field of Search ......... 165/45, 105, 39, 85, 106, 165/107; 237/63; 417/334, 335, 336

[56] References Cited
UNITED STATES PATENTS

| | | | |
|---|---|---|---|
| 2,282,013 | 5/1942 | Wetzsteon | 237/63 |
| 2,761,292 | 9/1956 | Coanda et al. | 165/45 |
| 2,764,943 | 10/1956 | Peters | 237/63 |
| 3,291,203 | 12/1966 | Gough | 165/85 |
| 3,618,569 | 11/1971 | Baer | 165/106 X |
| 3,648,767 | 3/1972 | Balch | 165/106 |
| 3,757,854 | 9/1973 | Culbertson | 165/106 |
| 3,822,740 | 7/1974 | Hackett | 165/45 |

*Primary Examiner*—Albert W. Davis, Jr.
*Assistant Examiner*—Sheldon Richter

[57] ABSTRACT

A freezing-warming apparatus cell which operates on a liquid convection principle in part, as well as by means of a mechanical propeller mounted in the cell. Circulation of the heat-exchange liquid in the cell occurs either because of the temperature differential between the upper and lower portions of the cell, or by the propulsion force provided by a mechanical device such as a propeller in the cell driven by an external source of energy, such as a small wind turbine, an electric motor, or the like, controlled by a thermostatic device responsive to the ambient temperature.

13 Claims, 15 Drawing Figures

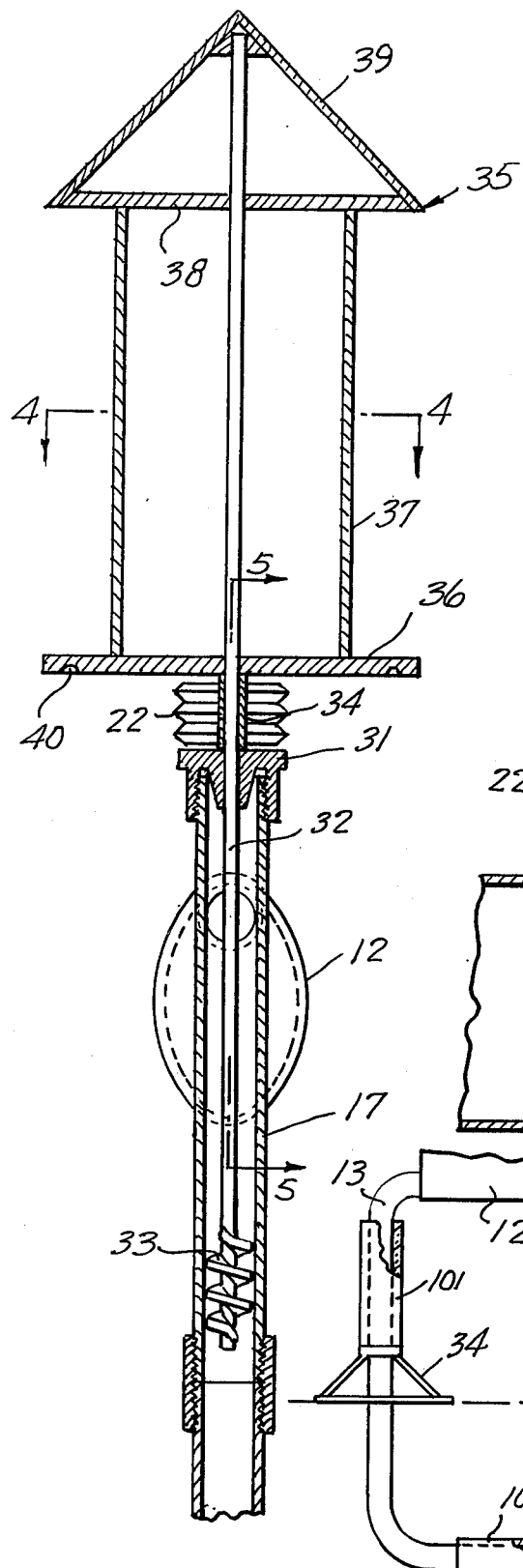
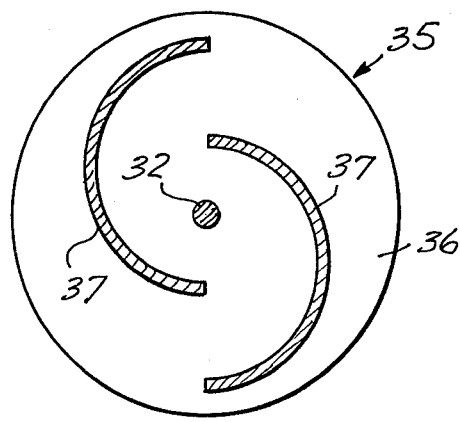
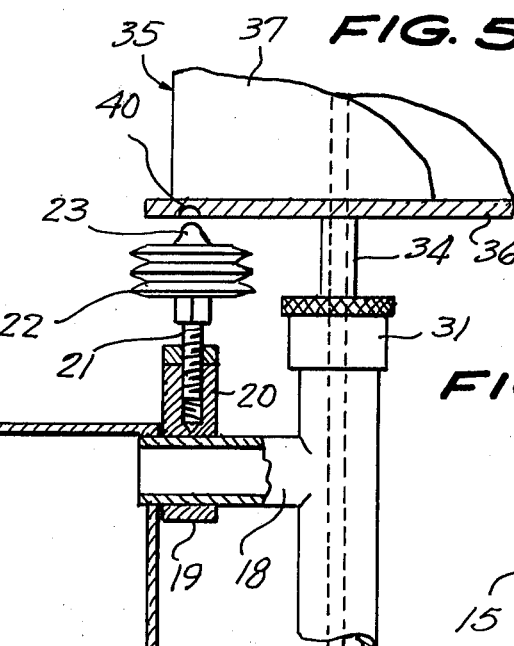
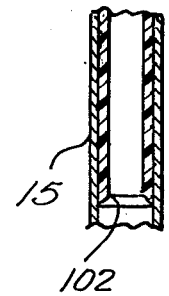
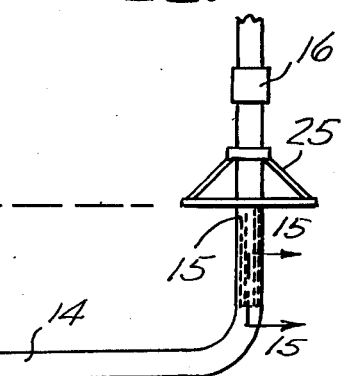

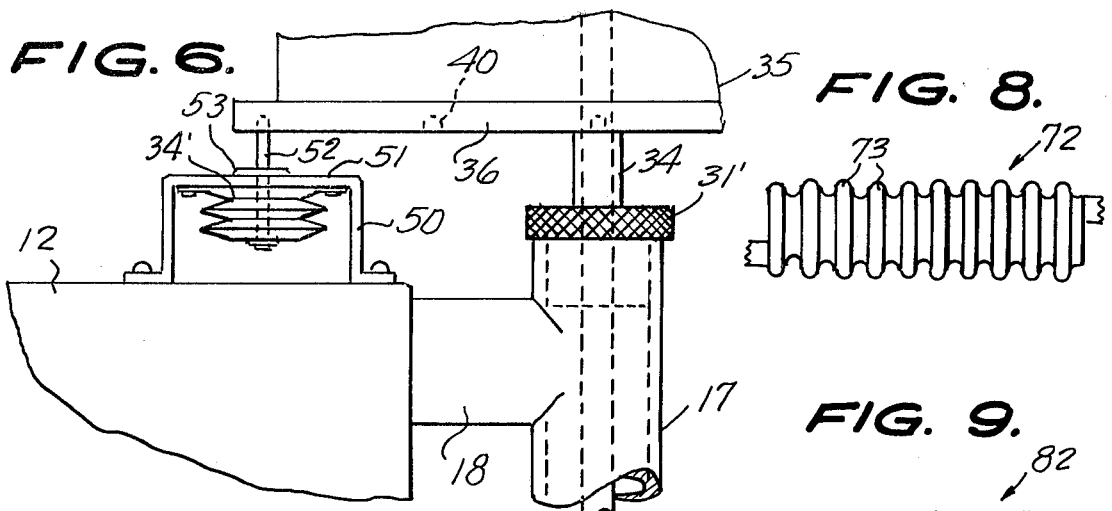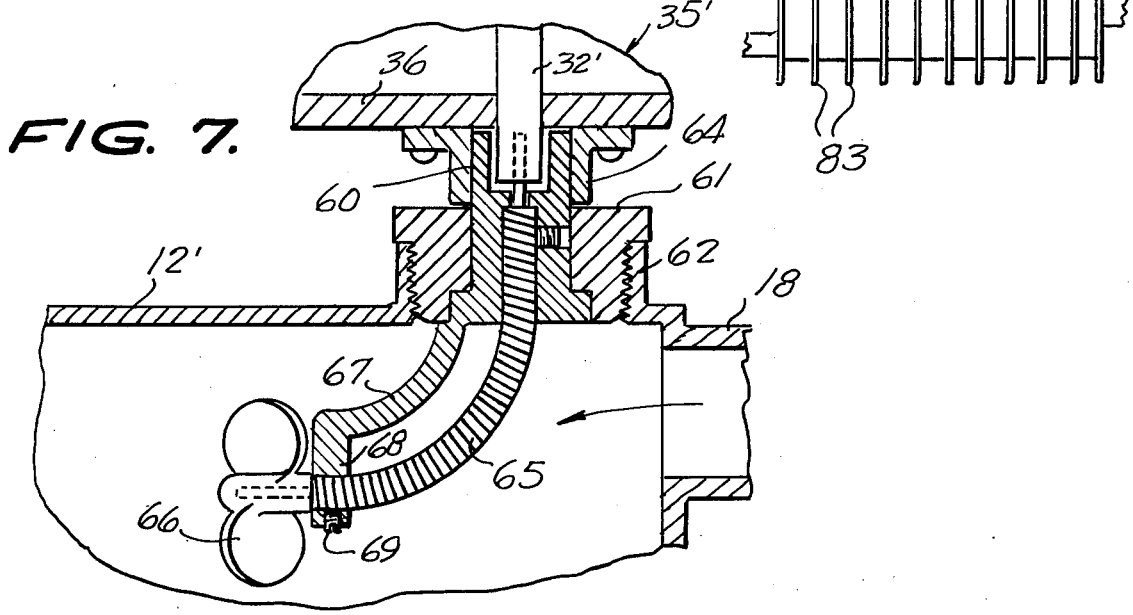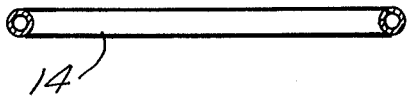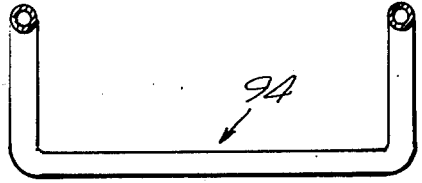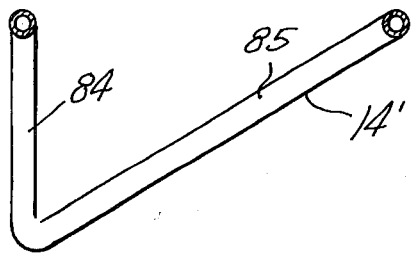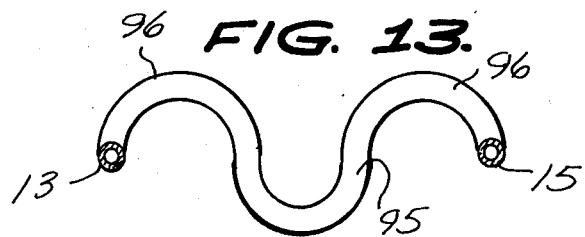

FREEZING-WARMING APPARATUS

This invention relates to heat exchange devices, and more particularly to a freezing-warming cell for transferring heat from a level a substantial distance below ground level to ground level, and vice versa which is adapted to be employed for freezing or warming material such as water, ice, soil, or the like by the convection action of liquid in the cell.

A main object of the invention is to provide a novel and improved freezing-warming apparatus which operates on a liquid convection principle as well as partly by a mechanical propelling means, the apparatus being simple in construction, being relatively inexpensive to construct, being easy to install, and providing a relatively inexpensive means for freezing or warming substances, such as water, ice, soil, or the like.

A further object of the invention is to provide an improved means for freezing water or other material, such as in the construction of ice bridges over streams, lakes, ponds, or the like, and to thaw the same for removal of the apparatus at a desired time, the apparatus involving relatively few parts, being durable in construction, and being arranged for utilizing external energy sources, such as wind power, or the like, to facilitate the circulation of the convection fluid employed in the apparatus.

A still further object of the invention is to provide a novel and improved freezing-warming apparatus for transferring heat between a lower level and ground level and operating on natural convection principles, the apparatus being especially suitable for installation in remote areas and being provided with means for utilizing external energy sources, such as wind power or the like, for assisting in the circulation of the convection fluid employed therein.

A still further object of the invention is to provide an improved heat transfer apparatus which may be successfully used for a wide range of purposes for transferring heat from a lower level to ground level and vice versa, the apparatus being especially useful for warming soil, as may be required in construction operations or in agricultural operations, and being also useful for a wide range of additional activities requiring heat transfer between a lower level and ground level.

Further objects and advantages of the invention will become apparent from the following description and claims, and from the accompanying drawings wherein:

FIG. 3 is an enlarged fragmentary vertical cross-sectional view taken substantially on line 3—3 of FIG. 2.

FIG. 4 is a horizontal cross-sectional view taken substantially on line 4—4 of FIG. 3.

FIG. 5 is a fragmentary vertical cross-sectional view taken substantially on line 5—5 of FIG. 3.

FIG. 6 is a fragmentary elevational view of a portion of a cell similar to the portion shown in FIG. 5, but showing a modification of the invention.

FIG. 7 is an enlarged fragmentary vertical cross-sectional view taken through the upper portion of a further modified form of freezing-warming cell according to the present invention, and illustrating the use of a mechanically driven propeller, being different from that shown in the embodiments illustrated in FIGS. 1 through 6.

FIG. 8 is a top plan view showing a modified form of upper container employed in a cell according to the present invention, employing corrugations to improve heat exchange with respect to the external atmosphere.

FIG. 9 is a top plan view showing another modified form of top container in a cell according to the present invention, showing the use of heat-transfer fins on the top container to provide an improved heat transfer between the top container and the outside atmosphere.

FIG. 10 is a horizontal cross-sectional view, to a reduced scale, taken substantially on line 10—10 of FIG. 2.

FIG. 11 is a horizontal cross-sectional view, similar to FIG. 10, but showing a modification of the shape of the bottom horizontal leg portion of the cell.

FIG. 12 is a horizontal cross-sectional view similar to FIGS. 10 and 11, but showing a still further modification of the shape of the horizontal bottom leg portion of the cell.

FIG. 13 is a horizontal cross-sectional view similar to FIGS. 10, 11 and 12, but showing a still further modified form of horizontal bottom leg portion which may be employed in a cell according to the present invention.

FIG. 14 is a side elevational view, partly in cross-section, of the lower portion of a cell generally similar to that shown in FIG. 1, but showing the use of thermal insulation elements to control the heat exchange rate of the cell.

FIG. 15 is an enlarged fragmentary vertical cross-sectional view taken substantially on the line 15—15 of FIG. 14.

Figure 1:
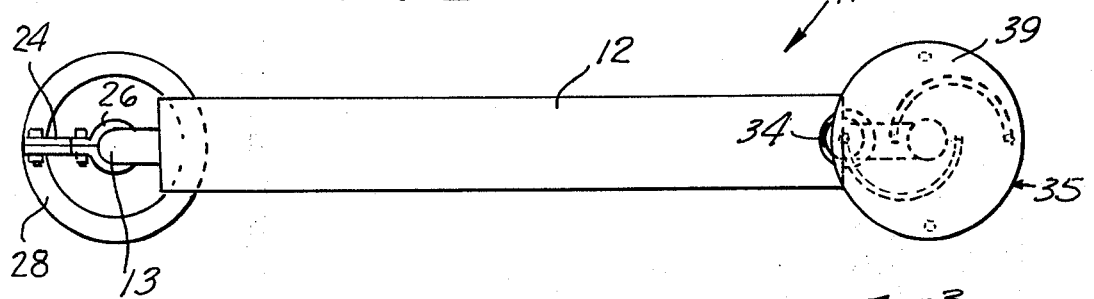
FIG. 1 is a top plan view of a typical freezing-warming apparatus cell constructed in accordance with the present invention.

Referring to the drawings, and more particularly to FIGS. 1 through 5, 11 generally designates a typical embodiment of a freezing-warming apparatus cell constructed in accordance with the present invention. The apparatus 11 is intended for installation in an area where transfer of heat between a lower level and ground level is desired, for example, for removing heat from a lower level, as would be required in forming ice bridges and similar ice structures, or for thawing same for removing the cell at a desired time in accordance with ecology requirements. The cell 11 can also be employed for transferring heat from ground level downwardly, for example, for warming or thawing soils, as would be required for construction operations, or for agricultural operations.

Figure 2:
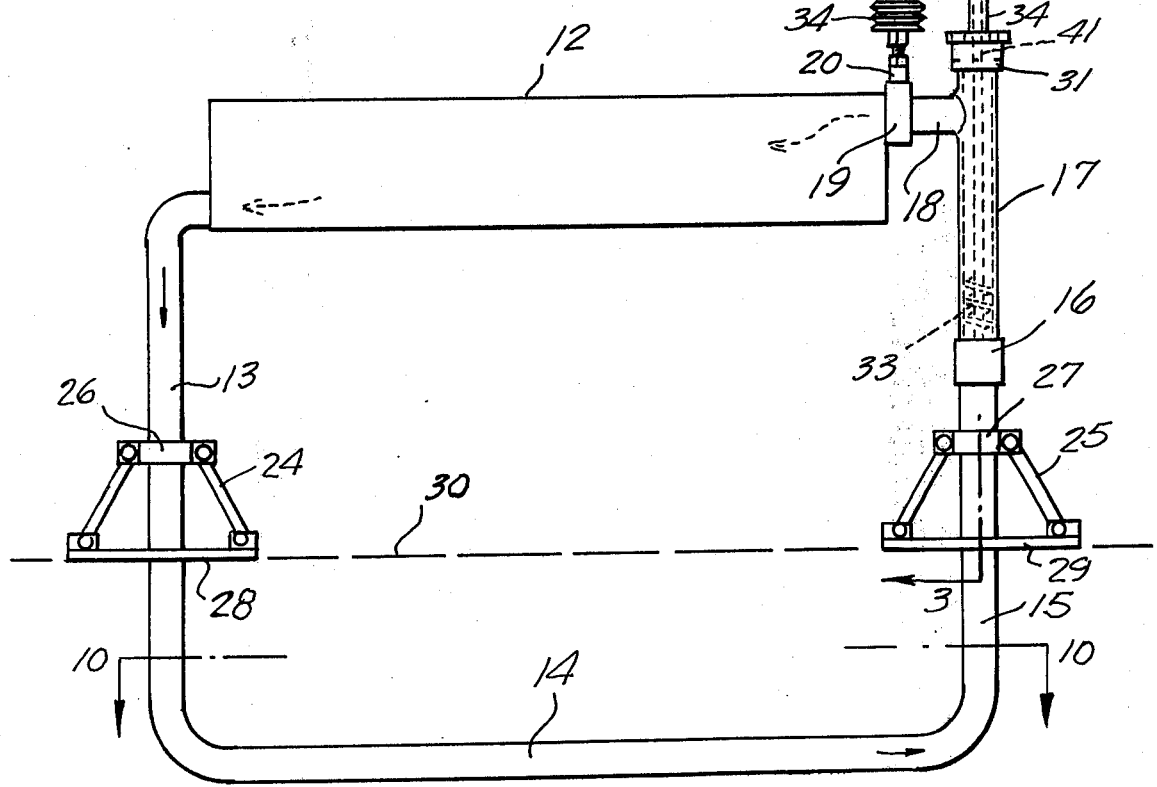
FIG. 2 is a side elevational view of the cell shown in FIG. 1.

The cell assembly 11 comprises a top horizontally extending main liquid container 12 having a vertical outlet conduit 13 connected to its lower left corner, as viewed in FIG. 2, said outlet conduit 13 extending downwardly to merge with a horizontal bottom heat transmission conduit 14 of suitable shape and of sufficient length to provide the desired heat transmission characteristics. At its right end, as viewed in FIG. 2, the bottom conduit 14 merges with an upwardly and vertically extending return conduit 15 which is connected by a coupling 16 to the lower end portion of a propeller housing 17. At its upper portion, housing 17 is provided with a laterally extending outlet arm 18 which is connected to the upper right corner portion of the main container 12, as shown in FIG. 5. Mounted on the connection arm 18 adjacent to the right end wall of the main container 12 is a collar bracket 19 having an upstanding top arm 20. Threadedly engaged in the top arm 20 is the lower stud portion 21 carried by a temperature-responsive bellows member 22 which is provided with a central upwardly projecting top projection 23. The bellows 22 is exposed to the atmosphere, and under cold ambient conditions, the bellows is contracted, whereby the projection 23 is in a lowered position. Under conditions of higher ambient temperature, the bellows 22 expands, raising the lug element 23, for a purpose presently to be described.

Respective supporting brackets 24 and 25 surround the vertical conduit members 13 and 15 and are clampingly engageable with said conduit members at adjusted positions thereon, said supporting assemblies 24 and 25 being provided with clamping collars 26 and 27 which surround the conduits 13 and 15 and which may be adjusted thereon. The bottom ground engaging portions 28 and 29 of the supporting bracket assemblies 24 and 25 are supportingly engagable with the ground, shown at 30, to thereby support the cell in an upright position, with the bottom heat-transfer arm 14 at a desired depth.

The vertical housing portion 17 is provided with a centrally apertured top screw cap member 31 which threadedly engages on the top end of the vertical housing portion 17 and which provides a journal bearing for a vertical propeller shaft 32 extending downwardly into housing 17 and being provided at its bottom end with a screw-type propeller 33. The vertical shaft 32 extends through a spacer bearing sleeve 34 supportingly engaged on screw cap 31, and secured to the top end portion of shaft 32 is a wind vane assembly, designated generally at 35. The wind vane assembly 35 comprises a bottom disc 36 surrounding shaft 32 and being supportingly engaged on the top end of bearing sleeve 34. A pair of semi-cylindrical offset opposing vertical wind vanes 37, 37 are secured on disc 36 on opposite sides of the shaft 32, as shown in FIG. 4, and rigidly secured to the top edges of the opposing wind vanes 37, 37 is a hollow roof structure comprising a horizontal disc member 38 and a conical downwardly diverging roof member 39 having its bottom rim secured to disc 38 to thereby define a hollow cone. The bottom element 38 of the roof structure is of sufficient diameter to protectively overlie bottom disc 36, and said bottom disc is likewise of sufficient diameter to substantially protectively overlie the thermostatic bellows element 22.

The bottom surface of disc member 36 is formed with spaced detent recesses 40 located at the same radial distance from shaft 32 as thermostat lugs 23, whereby said lug 23 may at times enter one of said recesses 40 to interlock therewith and hold the wind vane assembly 35 against rotation. In the embodiment illustrated in FIGS. 1 through 5, this occurs in response to a rise in temperature of the ambient surrounding atmosphere to a predetermined value.

The cell 11 may employ any suitable heat transfer liquid, for example, brine or the like, and the cell is filled preferably to a level above that of the upper container 12, for example, as shown at 41 in FIG. 2, where the liquid level is up to the screw cap 31. With the device installed in the manner illustrated in FIG. 2, with arm 14 a substantial distance below ground level 30, heat in the region of lower arm 14 will raise the temperature of the liquid therein and cause the liquid to generate a convection flow rightwardly, as viewed in FIG. 2, upwardly through the vertical conduit 15 and through the housing 17 into the upper right corner portion of main container 12. The colder liquid in main container 12, which is exposed to the relatively cold ambient atmosphere flows outwardly through the conduit 13 and downwardly to the bottom arm 14. This convection flow acts to convey heat from the region adjacent the arm 14 upwardly to the main container 12. As the ambient temperature is relatively low, the bellows 22 will be in relatively contracted condition, and the wind vane assembly 35 is free to rotate. The wind forces, if available in the area, will act upon the wind vane assembly 35 and cause it to rotate, thereby rotating the shaft 32 and the screw propeller 33. This acts to assist in the flow of the heat transmission liquid and thereby promote faster heat transfer between the region adjacent the bottom arm 14 to the exposed main top container 12. The heat transferred to the top container 12 is dissipated to the atmosphere, which is at a relatively low temperature in the circumstances above described. Thus, the region adjacent the arm 14 loses heat and thus, if the device is employed for building ice structures, such as an ice bridge or the like, the freezing action is greatly stimulated by the operation of the cell 11 in the manner above described.

If the ambient temperature rises sufficiently to expand bellows 22 to bring lug 23 into engagement with one of the detent recesses 40, rotation of the wind vane assembly 35 is inhibited and the cell 11 then operates only on the basis of convection.

FIG. 6 illustrates a modification wherein the cell may be employed for warming the ground or the region at a desired lower level. In this embodiment, a bracket 50 is mounted on the upper right corner portion of the main top container 12, the bracket being of inverted U-shaped, as shown in FIGS. 6, and a temperature-sensing bellows 34' is mounted in the bracket below the horizontal top arm 51 thereof with a central vertically movable pin element 52 extending upwardly through the bellows and through an apertured boss 53 provided on the top arm 51. The pin 52 is lockingly engagable with the detent recesses 40 when the bellows 34' is in a contracted position, as shown in FIG. 6. This holds the wind vane assembly 35 against rotation when the ambient temperature is relatively low. When the ambient temperature rises above a predetermined value, the bellows 34' expands and lowers the pin 52, releasing the wind vane assembly 35 and allowing it to rotate to thereby assist the circulation of the liquid in the cell, as above-described, namely, in a counterclockwise direction, as viewed in FIG. 2, whereby heat in the top container 12 will be transmitted to the bottom conduit arm 14 and thus to the adjacent region of soil or other material which is desired to warm. Under relatively low temperature conditions, wherein the wind vane assembly 35 is locked against rotation, the device may be employed as merely a convection cell for purpose similar to that described in connection with the embodiment shown in FIGS. 1 through 5.

FIG. 7 illustrates a modification wherein the wind vane assembly, shown at 35' has a vertical supporting shaft 32' and wherein the wind vane assembly 35' is suitably journalled on an upstanding bearing stud 60 forming part of a screw cap 61 threadedly engaged in an internally threaded filling spout 62 provided on the upper right corner portion of the main liquid container, shown at 12'. Secured to the bottom wall 36 of the wind vane assembly 35' is an annular bearing roller 64 which surrounds the stud 60 and which acts as a spacer means to support the wind vane assembly on the filling plug 61. A flexible transmission shaft assembly 65 connects the bottom end of shaft 32' to a propeller 66, the shaft 65 being suitably supported in a bracket 67 formed integrally with the stud member 60, the shaft 65 having its sheath secured in an aperture provided in a depending arm 68 of bracket 67 by means of a set screw 69, as shown in FIG. 7.

As shown in FIG. 7, the propeller 66 is located immediately ahead of the return conduit connection arm 18 so that liquid is propelled leftwardly through the main container 12' by the action of the propeller 66 responsive to the rotation of the wind vane assembly 35'. In the arrangement of FIG. 7, the propeller 66 and its supporting means are spaced sufficiently from the arm 18 so as not to interfere with convection flow of the liquid, so that the modification shown in FIG. 7 provides less obstruction to the convection flow than the screw propeller arrangement employed in the form of the invention shown in FIGS. 1 through 6.

It will be further noted that the arrangement shown in FIG. 6 differs somewhat from the arrangement shown in FIGS. 1 through 5 in a further aspect, namely, that a screw plug 31' is employed at the top end of the propeller housing 17 in place of the screw cap 31 employed in the arrangement illustrated in FIGS. 1 through 5.

The main container 12 may be made of any suitable configuration to facilitate transfer of heat therefrom or thereto. For example, as shown in FIG. 8, the main top container, shown at 72 is formed with corrugations 73 in its walls so as to greatly enlarge the surface area of the top container 72 and thereby increase the rate of heat transfer to or from said main container.

FIG. 9 shows another embodiment wherein the top main container, shown at 82 is provided with spaced heat transfer fins 83 to thereby similarly increase the heat transmission area and to speed up heat transmission to or from said main container.

As above-mentioned, the bottom arm of the cell may likewise have a suitable configuration to improve its heat transfer characteristics. In FIG. 10, the bottom arm 14 is shown as being of straight linear shape. As an alternative, the bottom arm may be V-shaped in the manner illustrated in FIG. 11, at 14', said bottom arm comprising the angularly separated merging arm segments 84 and 85. By this configuration, the length of the bottom arm is considerably increased, thereby increasing its heat transmission capability.

FIG. 12 shows another modification wherein the bottom arm, shown at 94 is generally U-shaped to similarly substantially increase its length and thereby increase its heat transfer capability.

FIG. 13 illustrates another modification wherein the bottom arm is of sinuous shape comprising continuously merging loops 95, 96 and forming an extended-length liquid path between the inlet conduit 13 and the return conduit 15.

As will be seen from the above, the heat transfer capability of the bottom arm of the cell may be greatly increased by increasing the total length of the bottom arm of the cell in any one of the various ways above-described, or in other ways which may occur to those skilled in the art.

As above-mentioned, the wind vane assembly 35 may be replaced by other suitable drive mans, for example, a small electric motor provided with a suitable energizing battery and with thermostatic switch means to control the energization of the motor in accordance with the ambient temperature, similarly to the manner in which the expansible bellows of the previously described embodiments of the invention control the wind vane drive means in accordance with the temperature-induced action of the bellows.

The elongated heat-conducting top container 12, 72 or 82 may have a suitable cross-sectional shape, for example, is preferably narrow in cross-sectional shape and somewhat vertically elongated. For example, as shown in FIG. 3, the top container 12 may have an oval shape with its long axis vertical. The vertically elongated cross-sectional shape provided an improvement in heat exchange efficiency in the transfer of heat between the container and the ambient atmosphere.

As will be further apparent from the above-description, the subsurface region containing the bottom conduit member 14, 14', 94, 95, 96, or other modified forms of bottom conduit members may comprise either a heat source or a heat sink, depending upon the selected use of the heat transfer device. When the device is used for thawing a subsurface region, the embodiment illustrated in FIG. 6 is employed, with the bellow 34' expanding responsive to relatively warm ambient atmospheric conditions, thereby releasing the wind vane assembly to provide the required fluid circulation in the closed circulation cell. Under these conditions, the subsurface region containing the bottom conduit member 14 is employed as a heat sink. Conversely, when the device is employed to freeze the subsurface region containing the bottom heat-conducting conduit member, the arrangement shown in FIGS. 1 through 5 is employed, wherein the bellows member 22 contracts responsive to relatively cold ambient atmospheric conditions, thereby allowing the wind vane assembly to operate, and enabling the subsurface region to act as a heat source.

Furthermore, from the above description and discussion, it will be apparent that the heat transfer device disclosed herein has significant advantages over previous devices employed for analogous functions in that it provides improved efficiency in the flow of the heat transfer liquid medium, offers improved flexibility and versatility in the geometric layout of a system of such heat transfer devices, offers a wide choice of components which may be employed in the fabrication of the heat transfer units, providing a physical separation of the warm and cold fluid portions when the device is employed purely as a convection-operated circulation loop, but having the ability to provide forced circulation and to mix the warm and cold fluids. Also, the device of the present invention is a field unit, but can be easily filled since it merely requires the removal of a filler cap or plug (such as cap 31 or plug 61), and can be completely sealed to prevent contamination of the surrounding area.

When the device is employed with the wind-actuated drive means described above, it requires no external power source. However, as above-mentioned, electric motor drive means may be employed, with accompanying energizing battery, if required. The drive means, either wind vane-operated or electric motor-operated, provides a means of improving efficiency in freezing a subsurface region, but also provides an opposite function, if desired, namely, by reversing the normal convection flow and forcing warm fluid into the bottom conduit member to thereby serve as a means for thawing material in the subsurface region containing the bottom conduit member.

FIGS. 14 and 15 show how the heat exchange characteristics of various portions of the cell assembly may be controlled by employing either internal or external heat insulation elements with these portions. For example, the vertical externally exposed conduit portions may be provided with heat insulation elements such as an external heat insulation sleeve 101 of selected length on the exposed portion of vertical conduit 13 above bracket 24 or an internal insulation sleeve 102 of selected length in the vertical conduit 15 below bracket 25. Also the bottom conduit 14 may be provided with an external insulation sleeve 103 of selected length, as shown. As will be apparent, any or all of the illustrated insulation sleeve elements may be employed, and their locations or lengths may be varied in accordance with the requirements of the particular installation.

Under certain conditions, such as in using the apparatus of the present invention for warming or thawing subsoil, or the like, some means or method of use is required to prevent a continuous convection flow when the ambient air is below freezing. Therefore, in order to prevent refreeze from taking place by convection flow, flow must be prevented by suitable valving or other means of shutting off flow of the liquid. In the apparatus of the present invention, this can be accomplished by reducing the amount of liquid in the top container 12 to a level slightly below that of the feed conduit 18. Under these conditions, the propeller 33 (FIG. 2) can still provide the necessary propulsion to produce the required normal liquid flow (counterclockwise, as viewed in FIG. 2), to maintain circulation of the liquid for warming or thawing the subsoil.

When certain specific embodiments of an improved heat transfer device for conveying heat between the ambient temperature and a subsurface region have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A heat transfer device for conveying heat between the ambient atmosphere and a sub-surface region comprising an elongated bottom heat-conducting conduit member disposed in said sub-surface region, an elongated top heatconducting container exposed to the ambient atmosphere and having depending conduits at its opposite ends, said conduits extending downwardly and being connected to the respective opposite ends of said bottom conduit member, forming a closed-circuit circulation cell, a liquid heat-transfer medium in said closed-circuit circulation cell and filling said cell sufficiently to allow circulatory convection flow through said closedcircuit cell responsive to exposure of said top heat-conducting container to temperatures lower than that of the subsurface region containing said bottom conduit member, propeller means rotatably mounted in a portion of said closed-circuit cell for forcing circulation, drive means mounted on the cell and being drivingly connected to said propeller means, and temperature-responsive mechanical detent means mounted on the cell in a position exposed to the ambient temperature and being at times lockingly engageable with said drive means so as to control said drive means in accordance with the ambient temperature.

2. The heat transfer device of claim 1, wherein said depending conduits extend vertically and respective surface-engaging supporting bracket members adjustably secured to said depending conduits for supporting the cell in an upright position with the bottom conduit member at a desired depth below the surface.

3. The heat transfer device of claim 1, wherein said cell is provided at its top portion with a removable closure member and wherein said drive means comprises a rotary wind vane member rotatably mounted on the cell and driving shaft means extending rotatably through said closure member and drivingly connecting said wind vane member to the propeller means.

4. The heat transfer device of claim 1, and heat insulation means partially covering at least one of the depending conduits.

5. The heat transfer device of claim 1, and heat insulation means in the interior of and in thermal shielding relation with at least one of the depending conduits.

6. The heat transfer device of claim 1, and heat insulation means partially covering said bottom heat-conducting conduit members.

7. The heat transfer device of claim 1, and heat insulation means mounted in thermal shielding relation with a portion of the conduit circuit branch comprising said depending conduits and said bottom conduit member.

8. The heat transfer device of claim 1, wherein said drive means comprises a rotary wind vane member rotatably mounted on the cell adjacent said top container.

9. The heat transfer device of claim 8, and wherein said detent means comprises a heat-responsive expansible member mounted on the cell adjacent said wind vane member and having a detent element at times engageable with said wind vane member to inhibit rotation of the wind vane member.

10. The heat transfer device of claim 9, wherein said wind vane member is coaxially mounted relative to one of said depending conduits and said propeller means comprises a screw propeller rotatably mounted coaxially in said one of the depending conduits and having a common shaft with said wind vane member.

11. The heat transfer device of claim 9, wherein said wind vane member includes a bottom disc element having detent recesses located to receive said detent element.

12. The heat transfer device of claim 11, wherein said expansible member is vertically mounted and said detent recesses are located in the bottom surface of said disc element.

13. The heat transfer device of claim 12, wherein said wind vane member is provided with a top cover element of sufficient size to overlie said disc element and to substantially protectively overlie the heat-responsive expansible member.

* * * * *